US009041861B2

(12) United States Patent
Tanaka et al.

(10) Patent No.: US 9,041,861 B2
(45) Date of Patent: May 26, 2015

(54) PERIPHERAL INFORMATION DISPLAY SYSTEM, DISPLAY DEVICE, AND PERIPHERAL

(75) Inventors: Ryuta Tanaka, Osaka (JP); Hiroshi Hasegawa, Osaka (JP); Kenichi Kimura, Osaka (JP); Tatsuya Yoshida, Osaka (JP); Yoshinori Satoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/498,786

(22) PCT Filed: Aug. 24, 2010

(86) PCT No.: PCT/JP2010/064228
§ 371 (c)(1),
(2), (4) Date: Mar. 28, 2012

(87) PCT Pub. No.: WO2011/040152
PCT Pub. Date: Apr. 7, 2011

(65) Prior Publication Data
US 2012/0200776 A1    Aug. 9, 2012

(30) Foreign Application Priority Data

Sep. 29, 2009  (JP) ................................. 2009-224514

(51) Int. Cl.
*H04N 5/445*    (2011.01)
*H04N 21/433*   (2011.01)
(Continued)

(52) U.S. Cl.
CPC .... *H04N 21/4334* (2013.01); *G06F 2213/0038* (2013.01); *H04N 21/4316* (2013.01); *H04N 21/43635* (2013.01); *H04N 21/44231* (2013.01)

(58) Field of Classification Search
USPC ......... 348/473, 552, 553, 563–565, 567, 569, 348/739
See application file for complete search history.

(56) References Cited

U.S. PATENT DOCUMENTS 5,648,813 A    7/1997  Tanigawa et al.
6,118,442 A    9/2000  Tanigawa
(Continued)

FOREIGN PATENT DOCUMENTS

JP    62-21379 A    1/1987
JP    2003-29895 A  1/2003
(Continued)

*Primary Examiner* — Jefferey Harold
*Assistant Examiner* — Humam Satti
(74) *Attorney, Agent, or Firm* — Birch, Stewart, Kolasch & Birch, LLP

(57) ABSTRACT

A peripheral information display with enhanced expandability by enabling the customization and display of peripheral related data such as status information for each peripheral. The peripheral information display system is configured from a TV (20) and a recorder (10) connected with a HDMI connection. The TV (20) is equipped with a memory portion (29) that stores display region information comprising region identification information used to identify a display region for arranging the peripheral related data of the recorder (10). The recorder (10) is equipped with a LAN I/F18 which transmits the peripheral related data of the recorder (10) in association with the region identification information to the TV (20) in response to the display region information acquired from the TV (20). The TV (20) displays the peripheral related data transmitted from the recorder (10) in the display region identified using the region identification information.

9 Claims, 12 Drawing Sheets

(51) Int. Cl.
*H04N 21/431* (2011.01)
*H04N 21/442* (2011.01)
*H04N 21/4363* (2011.01)

(56) References Cited

U.S. PATENT DOCUMENTS

| | | | |
|---|---|---|---|
| 6,262,763 B1* | 7/2001 | Totsuka et al. | 348/135 |
| 6,348,956 B1 | 2/2002 | Tanigawa et al. | |
| 7,224,404 B2* | 5/2007 | An et al. | 348/584 |
| 7,231,603 B2* | 6/2007 | Matsumoto | 715/716 |
| 7,554,614 B2* | 6/2009 | Satou | 348/734 |
| 2001/0050679 A1* | 12/2001 | Shigeta | 345/204 |
| 2002/0047945 A1 | 4/2002 | Tanigawa et al. | |
| 2002/0067430 A1* | 6/2002 | Lee | 348/569 |
| 2004/0121725 A1 | 6/2004 | Matsui | |
| 2005/0219147 A1* | 10/2005 | Sato | 345/1.1 |
| 2006/0098127 A1* | 5/2006 | Hsieh et al. | 348/839 |
| 2007/0222779 A1* | 9/2007 | Fastert et al. | 345/418 |
| 2008/0043146 A1* | 2/2008 | Lee | 348/569 |
| 2008/0046950 A1 | 2/2008 | Nakajima | |
| 2008/0080021 A1* | 4/2008 | Ohkita | 358/479 |
| 2008/0094525 A1* | 4/2008 | Song | 348/739 |
| 2008/0259011 A1* | 10/2008 | Hayashi | 345/87 |
| 2008/0271073 A1* | 10/2008 | Kim et al. | 725/37 |
| 2009/0033668 A1* | 2/2009 | Pederson et al. | 345/520 |
| 2009/0141180 A1* | 6/2009 | Kondo et al. | 348/723 |
| 2009/0174818 A1* | 7/2009 | Morita et al. | 348/569 |
| 2009/0193490 A1* | 7/2009 | Stone et al. | 725/151 |
| 2009/0195706 A1* | 8/2009 | Kikkawa et al. | 348/739 |
| 2009/0199239 A1* | 8/2009 | Chaki | 725/39 |
| 2009/0201423 A1* | 8/2009 | Sugiyama et al. | 348/564 |
| 2009/0256967 A1* | 10/2009 | Suzuki | 348/569 |
| 2010/0110294 A1* | 5/2010 | Oka | 348/564 |
| 2010/0134685 A1* | 6/2010 | Nakamura et al. | 348/569 |
| 2010/0185764 A1* | 7/2010 | Kondo et al. | 709/225 |
| 2010/0265401 A1* | 10/2010 | Yuki | 348/565 |
| 2011/0058103 A1* | 3/2011 | Lin et al. | 348/569 |

FOREIGN PATENT DOCUMENTS

| | | |
|---|---|---|
| JP | 2004-166193 A | 6/2004 |
| JP | 2008-48136 A | 2/2008 |
| JP | 2008-294661 A | 12/2008 |

* cited by examiner

FIG.3
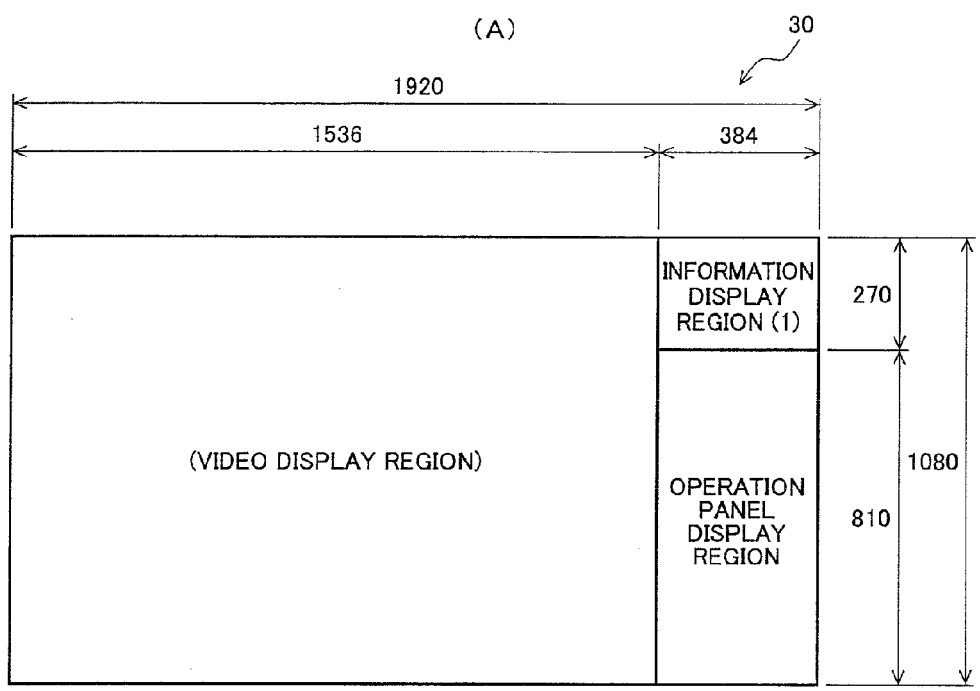
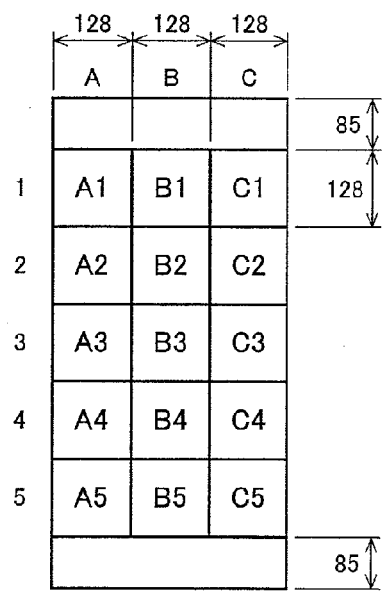

PERIPHERAL INFORMATION DISPLAY SYSTEM, DISPLAY DEVICE, AND PERIPHERAL

TECHNICAL FIELD

The present invention relates to a peripheral information display system, a display device, and a peripheral, and to a peripheral information display system capable of displaying on a display device the peripheral related data such as status information of peripherals connected to the display device, a display device making up the system, and a peripheral.

BACKGROUND ART

Up until now, it has been performed to display peripheral information on a television (TV) by connecting peripherals such as a recorder, a player, an STB (Set Top Box), and an AV amplifier to the television or to operate the peripherals through the television. For example, Patent Document 1 describes a television set capable of displaying peripheral operation panel information on its screen. In the case of the television set described in Patent Document 1, when a menu display key of a remote control is depressed, there appear selectably on the screen a VTR, a VHD, a BS tuner, a teletext receiver, etc., as peripherals connected to the television set. Then, when the user operates the remote control to selectively specify any one of the peripherals, operation panel information corresponding to the specified peripheral appears on the television screen.

PRIOR ART DOCUMENTS

Patent Document

Patent Document 1: Japanese Laid-Open Patent Publication No. 62-21379

SUMMARY OF THE INVENTION

Problem to be Solved by the Invention

In the method described in Patent Document 1, however, display information on the peripheral operation panel, etc., is prepared in advance in the television so that the display information is changed by the specification of the user, and therefore, only the predetermined peripherals are allowed at all times to be connected thereto. That is, the television retains in advance information on specified peripherals, and hence, if the specified peripherals are connected thereto, then the television can display corresponding information, but if a peripheral other than the specified ones is connected thereto, then the television cannot display corresponding information since it retains no corresponding information.

In this manner, when displaying peripheral information on the television, the display has hitherto been limited to peripherals corresponding to information retained in advance by the television, as a result of which even if the user tries connecting a new peripheral to the television, the peripheral information may not appear on the television, resulting in a problem of lacking in the expandability in the information display of peripherals.

The present invention was conceived in view of the above circumstances, and it is an object thereof to provide a peripheral information display system, a display device making up the system, and a peripheral, the peripheral information display system capable of enhancing the expandability in the information display of peripherals, by enabling the customization and display of peripheral related data such as status information on a peripheral-by-peripheral basis.

Means for Solving the Problem

In order to solve the above problem, a first technical means of the present invention is a peripheral information display system comprising, connected thereto, at least one peripheral and a display device capable of displaying peripheral related data of the peripheral, wherein the display device has a memory portion that stores display region information containing region identification information for identifying a display region to arrange the peripheral related data of the peripheral, the peripheral has a peripheral related data sending portion that sends the peripheral related data of the peripheral in association with the region identification information, depending on the display region information acquired from the display device, and the display device disposes and displays the peripheral related data sent from the peripheral in the display region identified by the region identification information.

A second technical means is the peripheral information display system as defined in the first technical means, wherein the display device performs scaling of an input video signal such that a display region of the input video signal does not overlap with a display region of peripheral related data of the peripheral.

A third technical means is the peripheral information display system as defined in the first technical means, wherein the peripheral related data is status information indicative of a status of action of the peripheral, the peripheral sends the changed status of action to the display device when the status of action of the peripheral changes, and the display device updates the status information in screen display based on the status of action sent from the peripheral.

A fourth technical means is the peripheral information display system as defined in the first technical means, wherein the display region information is information containing a size and a display position of the display region to display the peripheral related data of the peripheral in.

A fifth technical means is the peripheral information display system as defined in the fourth technical means, wherein the peripheral lays the peripheral related data out so as to be accommodated within a display region identified by the region identification information when sending the peripheral related data in association with the region identification information to the display device.

A sixth technical means is the peripheral information display system as defined in the fifth technical means, wherein the peripheral sends to the display device an offset signal for adjusting an arrangement position in the display region of the laid-out peripheral related data so as to fit the size of the display region.

A seventh technical means is the peripheral information display system as defined in the fifth technical means, wherein the peripheral resizes a display size of the laid-out peripheral related data so as to fit the size of the display region.

An eighth technical means is the peripheral information display system as defined in the first technical means, wherein the display device determines whether the peripheral supports information display functions provided by the peripheral information display system, and, if supported, sends the display region information to the peripheral.

A ninth technical means is a display device making up the peripheral information display system as defined in the first technical means.

A tenth technical means is a peripheral making up the peripheral information display system as defined in the first technical means.

Effect of the Invention

According to the present invention, the peripheral related data such as the status information can be customized and displayed on a peripheral-by-peripheral basis to thereby enable the expandability to be enhanced in the information display of the peripherals. This enables domestic peripherals to be linked to the television, allowing information of more peripherals to be displayed by the television.

BRIEF DESCRIPTION OF DRAWINGS

FIG. 3 is a diagram for explaining an example of setting of a display region for peripheral related data of a recorder on a display screen of a TV.

MODES FOR CARRYING OUT THE INVENTION

Referring to the accompanying drawings, preferred embodiments will now be described of a peripheral information display system, a display device configuring the system, and a peripheral, according to the present invention. The embodiments of the present invention will describe a case where the display device and the peripherals are connected to each other via an HDMI (High Definition Multimedia Interface).

More specifically, a function of HDMI Ethernet (registered trademark) Channel (hereinafter, HDMI HEC) in which two-way communications of Ethernet (registered trademark) signals are carried out through an HDMI cable is added in HDMI standard (version 1.4) published on May 28, 2009. This HDMI HEC-enabled HDMI is utilized. Naturally, the other communication means may be utilized such as HDMI CEC (Consumer Electronics Control), IEEE1394, LAN (Local Area Network), PLC (Power Line Communications), radio communication, and optical communication.

Figure 1:
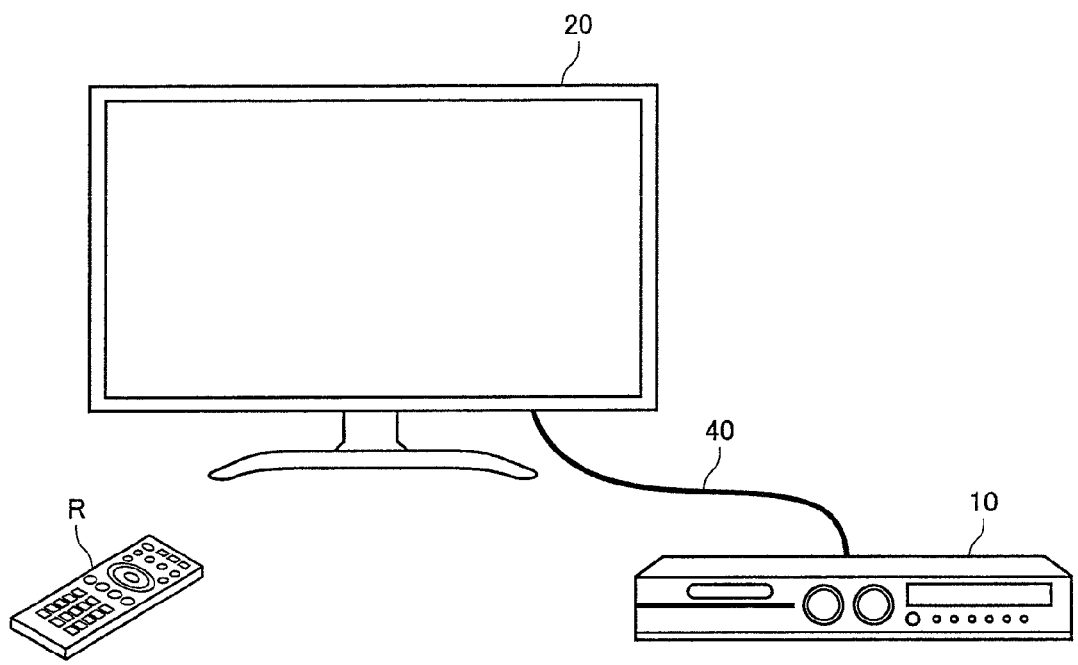
FIG. 1 is a diagram depicting an exemplary configuration of a peripheral information display system according to the present invention.

FIG. 1 is a diagram depicting an exemplary configuration of a peripheral information display system according to the present invention, in which 10 denotes a picture recording device (recorder) that is an example of the peripheral, 20 denotes a display device (TV), and 40 denotes an HDMI HEC-enabled HDMI cable. The recorder 10 and the TV 20 are connected to each other via the HDMI cable 40, enabling by use of the signal cable a transmission of video/audio signals, a transmission of Ethernet (registered trademark) signals, and a transmission of commands for device-to-device controls.

The HDMI will here be simply described. The HDMI is a digital interface for digitally connecting the TV and the peripherals and is adapted for the AV device by adding an audio transmission function and a copyright protection function to DVI that is a connection standard specification for the PC and the display. Until now, a plurality of cables for respective signals for video, audio, and control have been used for connecting the TV and the peripherals, but the HDMI merely requires a single cable so that wiring between the TV and the peripherals can be simplified.

Basic specifications as the standard for HDMI were formulated in December, 2002 (HDMI standard version 1.0) by HDMI Licensing, LLC that is a standardization organization, and thereafter the provision of CEC (Consumer Electronics Control) was added thereto as a control protocol for performing the control between AV devices in December, 2005 (HDMI standard version 1.2a).

Terms on CEC are defined in HDMI standard "2.2. Glossary of Terms", "CEC 2.2 Glossary of Terms", etc., in which a Sink device is defined as one having an HDMI input terminal to display output an AV stream, a Source device is defined as one having an HDMI output terminal to output the AV stream, and a Repeater device is as one having both the HDMI input terminal and the HDMI output terminal to input and output (transfer) the AV stream.

The HDMI standard defines a device-to-device control using the CEC. This CEC enables various controls based on proper physical addresses and logical addresses allocated to peripherals existing on an HDMI network. For example, if a DVD player connected via the HDMI is reproduced when the user views digital broadcasting, the television automatically performs the switch to the input to which the DVD player is connected. The remote control of the television may be used to operate a menu displayed on the DVD player or the power on/off thereof.

Figure 2:
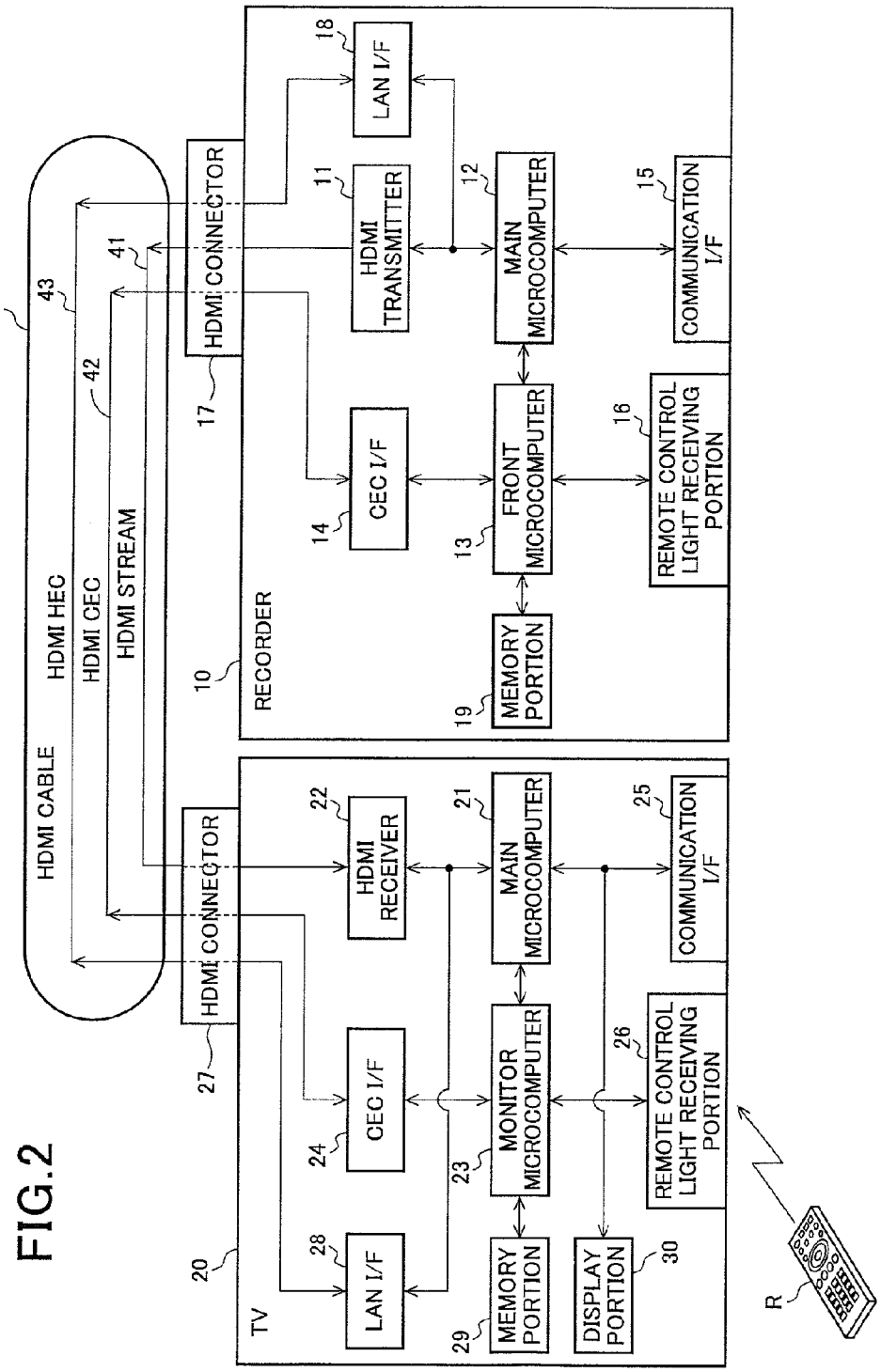
FIG. 2 is a block diagram for explaining the exemplary configuration of the peripheral information display system depicted in FIG. 1.

FIG. 2 is a block diagram for explaining the exemplary configuration of the peripheral information display system depicted in FIG. 1, the block diagram depicting the configuration where the recorder 10 and the TV 20 are connected via the HDMI cable 40.

The HDMI cable 40 includes a TMDS (Transition Minimized Differential Signaling) line 41 that transmits a video/audio stream as digital signals in a differential mode, a CEC line 42 that is a bidirectional bus for transmitting a control signal (CEC message) common to the peripherals, and an HEC line 43 that performs a two-way communication of the Ethernet (registered trademark) signal. The HDMI cable 40 further includes an I2C line that is used e.g., for sending EDID (Extended Display Identification Data) or for HDCP (High-bandwidth Digital Content Protection System) authentication.

The recorder 10 is provided with an HDMI transmitter 11, a main microcomputer 12, a front microcomputer 13, a CEC I/F 14, a communication I/F 15, a remote control light receiving portion 16, an HDMI connector 17, a LAN I/F 18, and a memory portion 19.

The HDMI transmitter 11 is connected via the HDMI connector 17 to the TMDS line 41 inside the HDMI cable 40, and reads out video data and audio data recorded in a recording medium such as a BD or a DVD for example to convert into an HDMI format stream consisting of video signals and audio signals interposed in blanking periods of the video signals. The stream obtained by the conversion is transmitted through the TMDS line 41 to the TV 20.

The main microcomputer 12 is a main CPU that controls the entire device and includes an HDMI controller to control the actions of the HDMI transmitter 11 and the LAN I/F 18.

The CEC I/F 14 is connected via the HDMI connector 17 to the CEC line 42 inside the HDMI cable 40 and enables a bidirectional communication of the CEC message with the TV 20. The action of the CEC I/F 14 is controlled by the front microcomputer 13 that includes a CEC controller, enabling the HDMI connected devices to be controlled by the CEC message. In the case of the CEC, the logical address (the device type) and the physical address (the device position) of each of the HDMI connected devices are acquired so that the CEC message can be sent to a desired device by specifying these logical address and physical address.

The front microcomputer 13 works with a low electric power and monitors at all times the CEC message transferred from the CEC line 42. The front microcomputer 13 is a sub-CPU that controls the remote control light receiving portion 16 receiving a remote control signal from a remote control device not depicted. Then, even when the main microcomputer 12 is powered off during the device standby mode, etc., the front microcomputer 13 operates and keeps enabling the sending/reception of the CEC message and the reception of the remote control signal.

The communication I/F 15 serves to perform a communication with the TV 20 via other means than the HDMI, allowing a connection with the TV 20 through communication means such as IEEE 1394, LAN, PLC, radio communication, and optical communication, for example.

The LAN I/F 18 is connected via the HDMI connector 17 to the HEC line 43 inside the HDMI cable 40, to enable a bidirectional communication of the Ethernet (registered trademark) signals with the TV 20. The LAN I/F 18 may be incorporated within the HDMI transmitter 11.

The memory portion 19 is a nonvolatile memory such as an EEPROM (Electrically Erasable and Programmable Read Only Memory) that stores the logical addresses and the physical addresses in the HDMI. The memory portion 19 is accessed as needed by the front microcomputer 13 or the main microcomputer 12 for the execution of data reading or writing. The memory portion 19 is not limited to the EEPROM, but instead it may be for example an HD (hard disc), a flash memory, etc.

The TV 20 is provided with a main microcomputer 21, an HDMI receiver 22, a monitor microcomputer 23, a CEC I/F 24, a communication I/F 25, a remote control light receiving portion 26, an HDMI connector 27, a LAN I/F 28, a memory portion 29, and a display portion 30. A tuner is not depicted.

The HDMI receiver 22 is connected via the HDMI connector 27 to the TMDS line 41 inside the HDMI cable 40 and receives a stream transferred from the recorder 10. The HDMI receiver 22 may be incorporated within the main microcomputer 21.

The main microcomputer 21 is a main CPU that controls the entire device and includes an HDMI controller to control the actions of the HDMI receiver 22 and the LAN I/F 28.

The CEC I/F 24 is connected via the HDMI connector 27 to the CEC line 42 inside the HDMI cable 40 and enables a bidirectional communication of the CEC message with the recorder 10. The action of the CEC I/F 24 is controlled by the monitor microcomputer 23 that includes the CEC controller, enabling the HDMI connected devices to be controlled by the CEC message.

The monitor microcomputer 23 works with a low electric power and monitors at all times the CEC message transferred from the CEC line 42. The monitor microcomputer 23 is a sub-CPU that controls the remote control light receiving portion 26 receiving a remote control signal from a remote control device R. Then, even when the main microcomputer 21 is powered off during the device standby mode, etc., the monitor microcomputer 23 operates and keeps enabling the sending/reception of the CEC message and the reception of the remote control signal.

The communication I/F 25 is intended to perform a communication with the recorder 10 via other means than the HDMI, allowing a connection with the recorder 10 through communication means such as IEEE 1394, LAN, PLC, radio communication, and optical communication, for example.

The LAN I/F 28 is connected via the HDMI connector 27 to the HEC line 43 in the HDMI cable 40 and enables a bidirectional communication of the Ethernet (registered trademark) signals with the recorder 10. The LAN I/F 28 may be incorporated within the HDMI receiver 22.

The memory portion 29 is the nonvolatile memory such as the EEPROM that stores the logical addresses and the physical addresses in the HDMI and that stores display region information which will be described later. The memory portion 29 is accessed when necessary by the monitor microcomputer 23 or the main microcomputer 21 for the execution of data reading or writing. The memory portion 29 is not limited to the EEPROM, but instead it may be for example the HD (hard disc), the flash memory, etc.

The display portion 30 is configured from a display such as an LCD (Liquid Crystal Display). In the TV 20, video/audio of the stream is separated by the HDMI receiver 22 and, if required, predetermined video signal processing and audio signal processing are performed to display a video on the display portion 30 and a sound is output from a loudspeaker (not depicted).

A main feature of the present invention lies in that the expandability in the information display of peripherals can be enhanced by making it possible to customize and display peripheral related data such as status information on a peripheral-by-peripheral basis. In the above example, the display device and the peripheral correspond respectively to the TV 20 and recorder 10.

The TV 20 has the memory portion 29 corresponding to a memory means that stores display region information containing region identification information for identifying a display region in which peripheral related data of the recorder 10 is arranged. The display region information is information that contains, as will be described later referring to FIG. 3(A), a display region size (384×270), a display position (1536, 0), and the number of display colors (256 colors) in addition to the region identification information. The region identification information is information for identifying the display region in which the peripheral related data are laid out. For example, if there are three display regions, then identification numbers "1, 2, and 3" are imparted to the respective display regions.

The recorder 10 is provided with the LAN I/F 18 corresponding to a peripheral related data sending portion that sends peripheral related data of the recorder 10 in association with the region identification information to the TV 20, depending on the display region information acquired from the TV 20. The peripheral related data are for example status information indicative of the status of action of the recorder 10, and in the case of the recorder 10, for example, information on title, chapter, replay time, hour, channel, etc. When the recorder 10 allocates the peripheral related data to the display region of the identification number "1", it sends the peripheral related data in association with the identification number "1" to the TV 20. It may be determined in advance on the recorder 10 which one of peripheral related data is to be allocated to which display region.

Then, the TV 20 disposes and displays the peripheral related data sent from the recorder 10 in the display region identified by the region identification information (the identification number "1"). At this time, when the status of action of the recorder 10 changes, the recorder 10 sends the changed status of action to the TV 20 which in turn updates the status information in the screen display based on the status of action sent from the recorder 10. The change of the status of action refers to e.g., the case where the chapter number has changed of the content being currently reproduced by the recorder 10. In such a case, the changed chapter number is sent from the recorder 10 to the TV 20 so that the TV 20 updates the chapter number being displayed in the screen based on the chapter number sent from the recorder 10.

As another example of the method of updating the status information on screen display by the TV 20, the TV 20 may acquire periodically the status of action of the recorder 10 from the recorder 10 and update the status information on screen display based on the acquired status of action. In the case of this method, the TV 20 acquires periodically the status of action of the recorder 10 irrespective of whether the status of action of the recorder 10 has changed, and therefore data are sent every time from the recorder 10 to the TV 20, resulting in an increased communication load. Accordingly, the recorder 10 may be provided with a flag indicative of whether the status of action of the recorder 10 has changed. The TV 20 refers to the flag when accessing the recorder 10, and if it is determined from the flag that the status of action of the recorder 10 has changed, acquires the changed status of action from the recorder 10. That is, if there is no change in the status of action of the recorder 10, then the TV 20 does not acquire the status of action form the recorder 10, as a result of which the data of this status of action need not be sent, contributing to a relief from the communication load.

When the information display screen is closed on the TV 20 in response to the user's operation, it is desired to notify the recorder 10 of that effect from the TV 20 and notify the recorder 10 of the timing to end the communication in accordance with the information display.

Thus, according to the present invention, device related information such as the status information can be customized and displayed for each of the peripherals, enabling the expandability in the information display of the peripherals to be enhanced.

Although the recorder 10 acquires the display region information from the TV 20 at this time, two methods are conceivable in the case of the HDMI connection, i.e., a first method of utilizing an EDID and a second method of utilizing a vendor command of the CEC message.

The Sink device (TV 20 in this case) in conformity with the HDMI standard has the EDID in its internal memory. The EDID is an ID proper to the TV for transmitting the TV model name and set values (resolution, etc.) to the Source device (recorder 10 in this case) connected to the TV, and an HDMI control signal line (12C) is used for the interchange of the EDID. For example, when the recorder 10 is connected to the TV 20 via the HDMI, the recorder 20 accesses the TV 20 to read the EDID so that it can output videos at a resolution depending on the TV 20.

In the first method, the display region information is written in advance into the EDID. This allows the recorder 10 when accessing the TV 20 to read in and acquire the display region information contained in the EDID.

In the second method, the CEC message is sent together with the display region information added thereto from the TV 20 to the recorder 10. As the CEC message there may be available e.g., the vendor command that the maker can define on its own terms.

At this time, the TV 20 performs a scaling of the input video signal which will be described below so as to prevent the display region of the input video signal and the display region of the peripheral related data of the recorder 10 from overlapping.

FIG. 3 is a diagram for explaining an example of setting of the display region for the peripheral related data of the recorder 10 on the display screen of the TV 20. FIG. 3(A) depicts an example of setting of the information display region in which the peripheral related data of the recorder 10 is displayed and of an operation panel display region in which an operation panel of the recorder is displayed, and FIG. 3(B) depicts a matrix information (array information) for arraying image data for operation buttons making up the operation panel.

In the example of FIG. 3(A), the screen specifications of the display portion 30 of the TV 20 are such that the effective pixel count per line (horizontal direction) is 1920 pixels and that the effective pixel count in the vertical direction is 1080 pixels. The size of the video signal display region is 1536× 1080, the size of the information display region of the peripheral related data of the recorder 10 is 384×270, and the display position of the peripheral related data is (1536, 0).

The size of the operation panel display region on the operation panel of the recorder 10 is 384×810 and the display position of the operation panel is (1536, 270). Thus, the TV 20 sets in advance the display regions of the peripheral related data and the operation panel of the recorder 10. Then, the TV 20 performs scaling of the input video signal for display so as to conform to the display region size (1536×1080) of the video signal. The display region size of the peripheral related data and the operation panel may be appropriately determined depending on the inch size of the TV 20.

For example, in the case where the user allows the display of the peripheral related data and the operation panel of the recorder 10 by the operation of the remote control device R during viewing a program on the TV 20, the video signal of the program is subjected to the scaling so that the program video does not overlap with the display region of the peripheral related data and the operation panel. This prevents the program video during viewing from being hidden by the peripheral related data and the operation panel, causing no impairment of the visual recognizability.

A method for arraying image data for the operation buttons onto the operation panel will hereinbelow be described. The TV 20 is provided with the memory portion 29 that stores the operation panel information containing array information (matrix pattern of FIG. 3(B)) for arraying on the screen the image data for the operation buttons making up the operation panel of the recorder 10. The recorder 10 is provided with the memory portion 19 storing the image data for the operation buttons and with the LAN I/F 18 that, depending on the operation panel information acquired from the TV 20, sends the image data for the operation buttons stored in the memory portion 19 in association with the array information to the TV 20. When displaying the operation panel of the recorder 10, the TV 20 arranges and displays the image data for the operation buttons sent from the recorder 10 at positions corresponding to the array information.

Then, when any piece of the image data for the operation buttons is selectively specified by the user, the TV 20 sends the array information on the selectively specified image data to the recorder 10. The recorder 10 is provided with a data table that correlates the array information sent to the TV 20 with functions allocated respectively to the image data for the operation buttons, and the recorder 10 is controlled to identify from the data table a function corresponding to the array information on the image data sent from the recorder 10, to execute the identified function. The data table is intended to be stored in the memory portion 19.

The operation panel information is intended to contain, specifically, in addition to the above array information, the display region size of the operation panel, the display position, the number of the display colors, and the display size of the image data for the operation buttons. The array information represents the position and the number of image data for the operation buttons in the form of a matrix pattern. In the example of the matrix pattern depicted in FIG. 3(B), the display size of the image data for one operation button is set to 128×128, and these image data are arrayed in a matrix form of 3 columns (A, B, and C)×5 rows (1, 2, 3, 4, and 5). This case allows the array of 15 image data for the operation buttons. Then, the TV 20 manages coordinates (in this case, column A, row 1; column A, row 2; . . . ) in 3 columns×5 rows, and, when receiving image data for an operation button and a corresponding coordinate from the recorder 10, disposes the image data for the operation button at a position corresponding to the corresponding coordinate.

In the above, the image data for the operation buttons include image data functioning as the operation buttons and used as the real operation buttons, and image data used only for the representation such as operation guidance (operational explanation). The image data format may be any format as long as it can handle images of bitmap, JPEG (Joint Photographic Experts Group), etc.

When the recorder 10 acquires 3 columns×5 rows as the array information from the TV 20, it allocates the image data for the operation buttons thereto, for example, image data of "power button" to column A, row 1, image data of "replay button" to column A, row 2, and sends the image data for the operation buttons in association with the array information to the TV 20. The recorder 10 stores the correspondence relationships (image data, array, and function) at that time as the data table in the memory portion 19. Then, the TV 20 arrays and displays the image data for the operation buttons sent form the recorder 10 in compliance with the positions (also called coordinates) indicated by the array information.

Although the TV 20 can display the operation panel containing the image data for the operation buttons of the recorder 10 in this manner, the TV 20 has merely to provide the display region of the operation panel and the recorder 10 determines which one of operation button image data is to be disposed at which position, whereupon as long as it supports the information display region expansion function according to the present invention, any peripherals can display the operation panel.

When one of the image data for the operation buttons on the screen is selectively specified by the user acting on the remote control device, the TV 20 has only to send the coordinate of the image data for the operation button, not the operation command of that operation button, to the recorder 10. Based on the coordinate sent from the TV 20, the recorder 10 can identify a corresponding function and execute the function. For example, if the coordinate is "column A, row 2 (A2)", then the recorder 10 executes a replay since "replay button" is allocated thereto.

In this manner, the operation panel can be customized and displayed on a peripheral-by-peripheral basis irrespective of whether the display device keeps the operation panel, thereby achieving enhanced expandability in the operation of the peripherals.

As set forth hereinabove, the display region information is composed of four pieces of information, i.e., the display region size of the peripheral related data, the display position thereof, the number of display colors thereof, and region identification information for identifying the display region, and in this example, being respectively 384×270, (1536, 0), 256 colors, and the identification number "1" in the mentioned order. Then, this display region information is acquired by the recorder 10 by being sent using the CEC message by the TV 20 to the recorder 10 or by reading the EDID of the TV 20 by the recorder 10.

Figure 4:
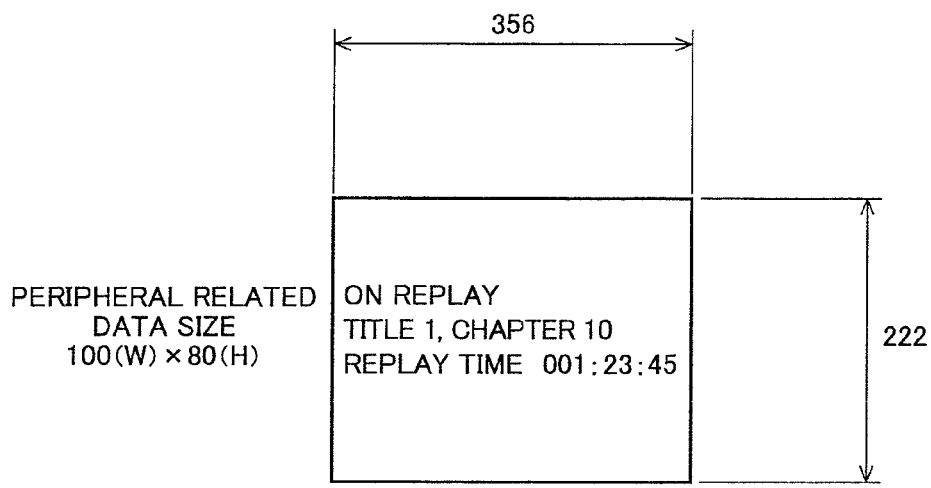
FIG. 4 is a diagram depicting an example of the display size after the peripheral related data of the recorder are laid out.

FIG. 4 is a diagram depicting an example of the display size after the peripheral related data of the recorder 10 are laid out. The recorder 10 lays out the peripheral related data such as the title, chapter, replay time, hour, and channel for example, etc., so as to lie within the display region size (384×270) sent from the TV 20. In this example, the letter strings (status of action, title, chapter, and replay time) of the peripheral related data are laid out in 1 column and 3 rows so that the display size is 356×222. This peripheral related data is not limited to the letter strings, and, for example, image data may be employed in the case of displaying thumbnail images of the title. Thus, when sending the peripheral related data correlated with the region identification information to the TV 20, the recorder 10 can lay out the peripheral related data so as to lie within a display region identified by that region identification information, with the result that the TV 20 has merely to provide the display region for the peripheral related data, contributing to a remarkable reduction of the processing load of the TV 20.

As will be described later referring to FIG. 9, offset information may be sent for adjusting the arrangement position in the display region of the peripheral related data (display size: 356×222) after the layout so as to fit the display region size sent from the TV 20.

Figure 5:
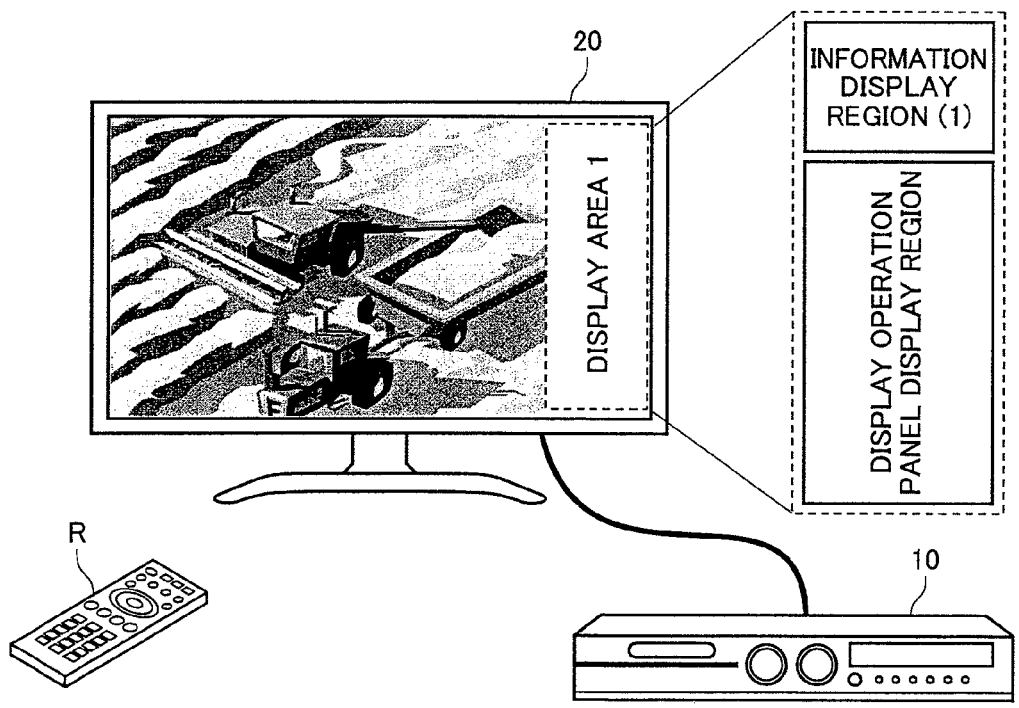
FIG. 5 is a diagram depicting an example of arrangement of an information display region displaying the peripheral related data of the recorder on the TV screen.
Figure 6:
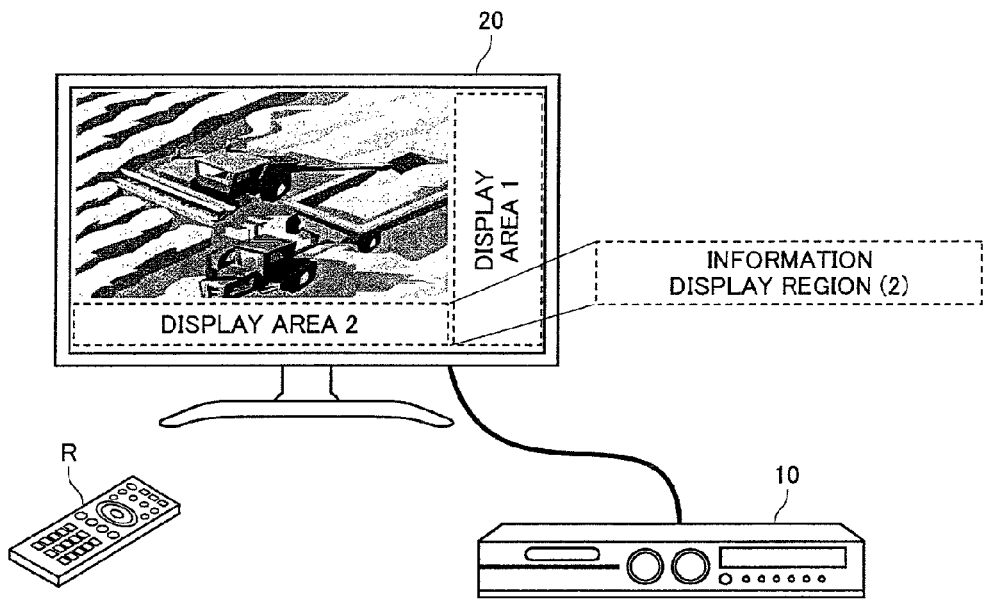
FIG. 6 is a diagram depicting another example of arrangement of the information display region displaying the peripheral related data of the recorder on the TV screen.
Figure 7:
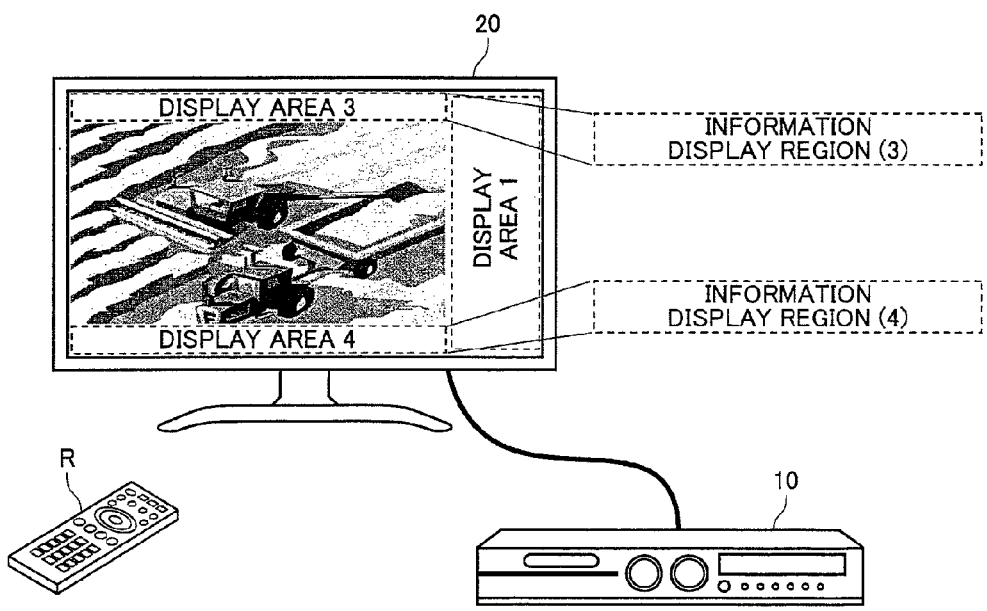
FIG. 7 is a diagram depicting a further example of arrangement of the information display region displaying the peripheral related data of the recorder on the TV screen.

FIG. 5 to FIG. 7 are diagrams depicting examples of arrangement of the information display region displaying the peripheral related data of the recorder 10 on the screen of the TV 20. In the example of FIG. 5, a display area 1 is disposed on the right side of the screen, the display area 1 including, arranged thereon, an information display region (1) displaying the peripheral related data of the recorder 10 and an operation panel display region displaying the operation panel of the recorder 10. The example of FIG. 6 has a display area 2 disposed at the bottom of the screen in addition to the display area 1, the display area 2 including an information display region (2) displaying the peripheral related data of the recorder 10. The example of FIG. 7 has, in addition to the display area 1, a display area 3 disposed at the top of the screen, the display area 3 including an information display region (3) displaying the peripheral related data of the recorder 10 and a display area 4 at the bottom of the screen, the display area 4 including an information display region (4) displaying the peripheral related data of the recorder 10. Identification numbers "1" to "4" are allocated, respectively, as region identification information, to the information display regions (1) to (4).

Figure 8:
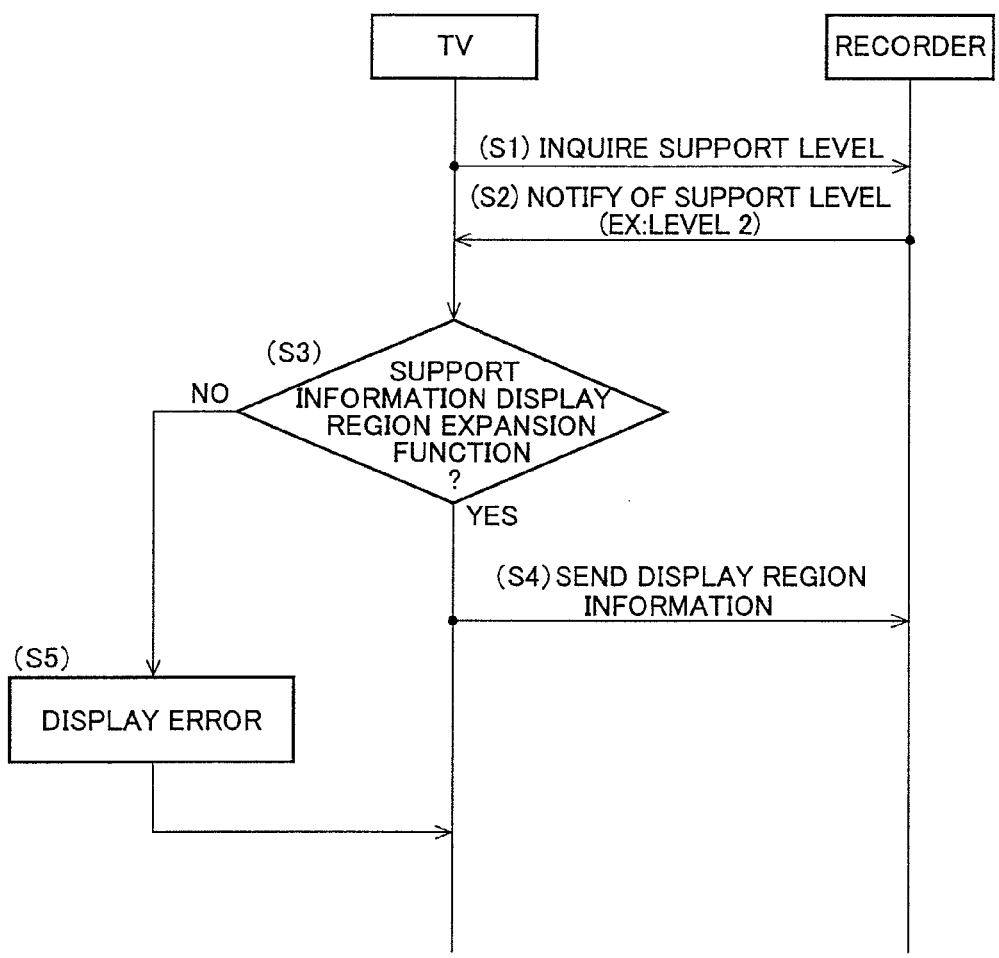
FIG. 8 is a diagram for explaining an example of a method of acquiring display region information from the TV by the recorder.

FIG. 8 is a diagram for explaining an example of a method of acquiring the display region information from the TV 20 by the recorder 10. Here, the recorder 10 connected to the TV 20 does not necessarily support the information display region expansion function according to the present invention (i.e., information display function provided by the peripheral information display system of the present invention). Accordingly, this example is configured such that, when the TV 20 and the recorder 10 are connected via the HDMI, the TV 20 inquires the support level of the recorder 10 and, depending on the result, sends the display region information to the recorder 10.

First, the TV 20 inquires of the recorder 10 the support level for determining whether it supports the information display region expansion function according to the present invention (S1), and the recorder 10 returns (notifies) its support level to the TV 20 (S2). The recorder 10 retains in advance its support level in the internal memory and retains "level 1" if not supported and "level 2" if supported.

Then, the TV 20 determines whether recorder 10 supports the information display region expansion function, based on the support level returned from the recorder 10 (S3). At that time, if the return from the recorder 10 is "level 2", then the TV 20 determines that the recorder 10 is a supporting peripheral (case of YES) and sends display region information to the recorder 10 (S4). If the return from the recorder 10 is "level 1" at S3, then the TV 20 determines it as being unsupporting peripheral (case of NO) and makes an error display (S5). In the absence of any return for the inquiry at S1, the TV 20 may determine the recorder 10 as being unsupporting.

Although this example may use the vendor command of the CEC message for example for the communication between the TV 20 and the recorder 10, the communication means is not intended to be limited to the CEC.

Figure 9:
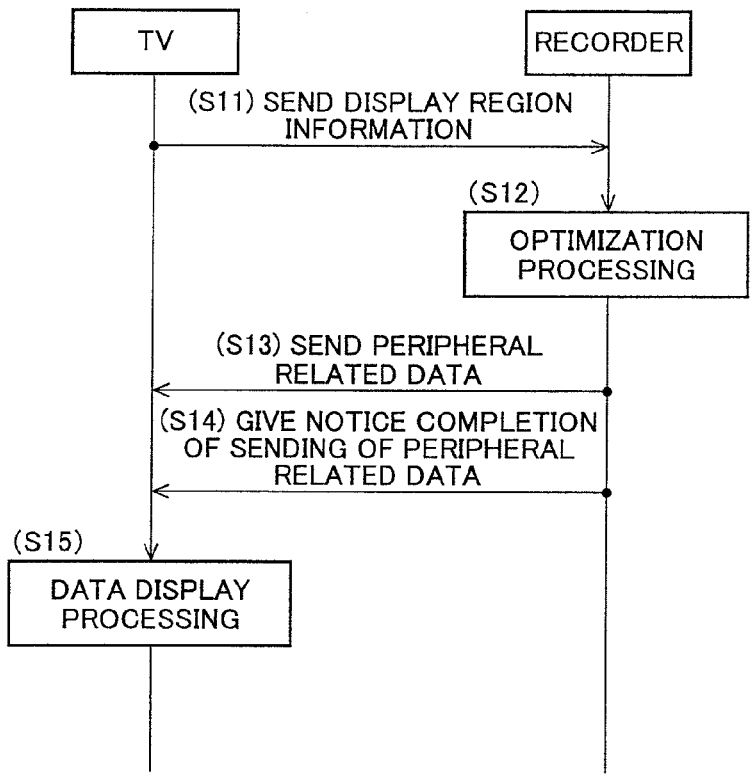
FIG. 9 is a diagram for explaining an example of display size optimization processing effected by the recorder.

FIG. 9 is a diagram for explaining an example of display size optimization processing effected by the recorder 10. As already described in FIG. 8, if the TV 20 confirms that the recorder 10 supports the information display region expansion function, then it sends display region information to the recorder 10 (S11). In this example, as depicted in FIG. 3(A) described above, the display region information to be sent are the display region size of the peripheral related data: 384× 270, the display position: (1536, 0), the number of display colors: 256 colors, and the region identification information: identification number "1".

Next, the recorder 10 performs display size optimization processing of the peripheral related data in accordance with the display region information sent from the TV 20 (S12). In this case, the recorder 10 lays out the peripheral related data of the recorder 10 so as to lie within the peripheral related data display region size (384×270) sent from the TV 20, to acquire the display size of 356×222 (FIG. 4). In this instance, the display size of the peripheral related data after the layout does not coincide with the display region size sent from the TV 20, with the result that the recorder 10 performs an offset calculation for adjusting the laid-out peripheral related data arrangement position so as to fit the display region size sent from the TV 20.

Figure 10:
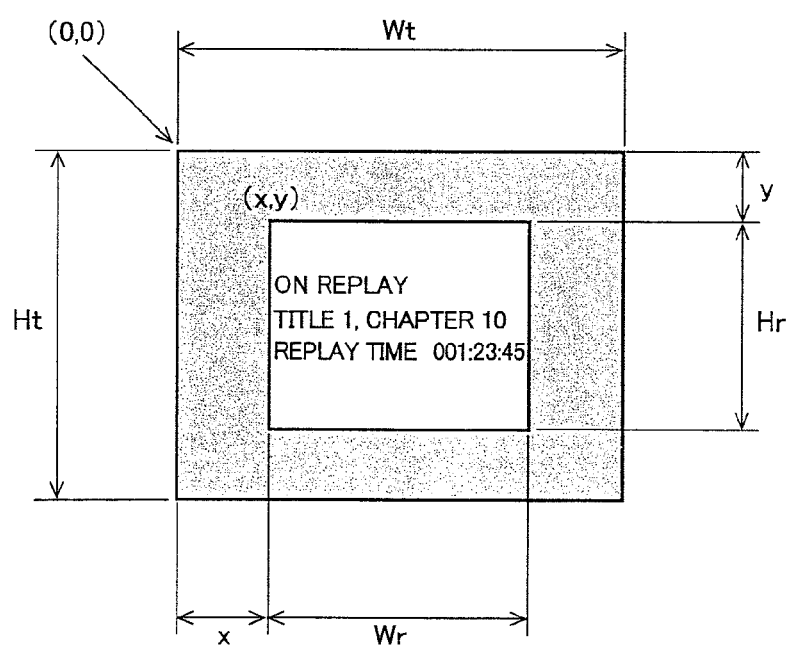
FIG. 10 is a diagram for explaining an example of offset processing of the peripheral related data.

As depicted in FIG. 10, since the display region size of the TV 20 is Wt×Ht (384×270), and the display size of the peripheral related data is Wr×Hr (356×222), the display region size of the TV 20 is greater than the display size of the peripheral related data. In such a case, an offset calculation for example may be performed for centering and displaying the peripheral related data. Specifically, the calculation is made as $$x=(Wt-Wr)/2=14, y=(Ht-Hr)/2=24$$

to obtain the offset amount (x=14, y=24). Then the recorder 10 sends the obtained offset amount as offset information to the TV 20 when sending the peripheral related data thereto.

The recorder 10 may resize the peripheral related data display size so as to match the display region size sent from the TV 20. That is, the letter size or the image size of the peripheral related data are resized so as to match the display region size of the TV 20. For example, in the case of the peripheral related data display size<the display region size of the TV 20 as described above, the letter size or image data of the peripheral related data are enlarged within a range accommodated within the display size of the TV 20.

In FIG. 9, the recorder 10 sends the peripheral related data to the TV 20 after the execution of the display region optimization processing as described above (S13). The peripheral related data includes offset information (e.g., x=14, y=24) of the peripheral related data and an attribute (e.g., either only display or blank) of the peripheral related data, as well as the peripheral related data such as status information and region identification information (e.g., identification number "1") for identifying a display region to be arranged in. Then, the recorder 10 notifies the TV 20 of the completion of sending of the peripheral related data (S14) and the TV 20 performs data display processing based on the peripheral related data sent from the recorder 10 (S15).

In the processing of data sending from the recorder 10 to TV 20, image data may also be sent, and hence more high-speed data sending becomes feasible by using the HDMI HEC line 43 that is faster in communication speed than the HDMI CEC line 42.

Figure 11:
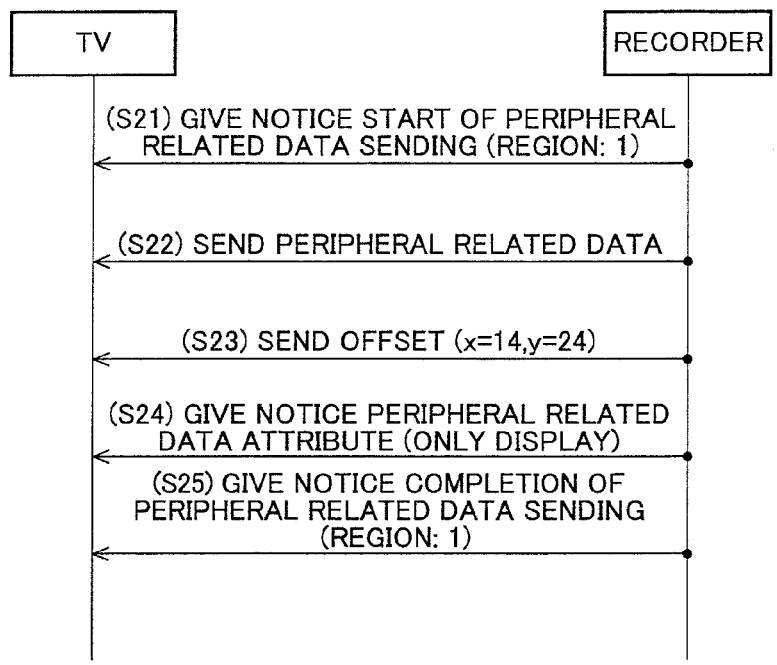
FIG. 11 is a diagram for explaining an example of processing in the case of arranging the peripheral related data within a region 1.

FIG. 11 is a diagram for explaining an example of processing in the case of arranging the peripheral related data within a region 1. The recorder 10 notifies the TV 20 of the start of sending of the peripheral related data for the area 1 (identification number "1") (S21). Then, the recorder 10 sends the peripheral related data (title, chapter, etc.) to the TV 20 (S22); sends thereto the offset information (in this case, x=14, y=24) depicted in FIG. 10 (S23); and notifies it of the attribute (in this case, "only display") of the peripheral related data (S24). Finally, the recorder 10 notifies the TV 20 of the completion of sending of the peripheral related data (S25).

Figure 12:
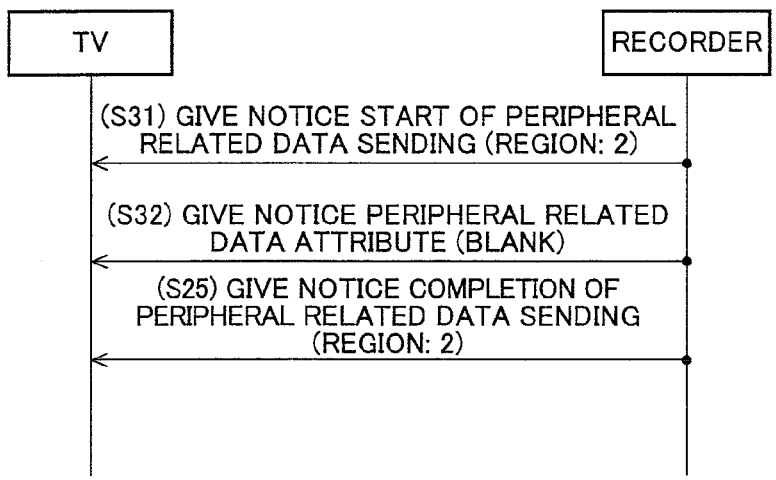
FIG. 12 is a diagram for explaining an example of processing in the case of blanking a region 2 of the information display region.

FIG. 12 is a diagram for explaining an example of processing in the case of blanking a region 2 of the information display region. The recorder 10 notifies the TV 20 of the start of sending of the peripheral related data for the region 2 (identification number "2") (S31). Then, the recorder 10 notifies the TV 20 of the attribute (in this case, "blank") of the peripheral related data (S32). Finally, the recorder 10 notifies the TV 20 of the completion of sending of the peripheral related data for the region 2 (S33). In the case of this example, nothing is displayed in the region 2 (identification number "2") since the peripheral related data attribute is "blank".

Exemplary actions of the peripheral information display system of the present invention will hereinbelow be described based on screen transitions of the TV 20 depicted in FIGS. 13 to 15.

Figure 13:
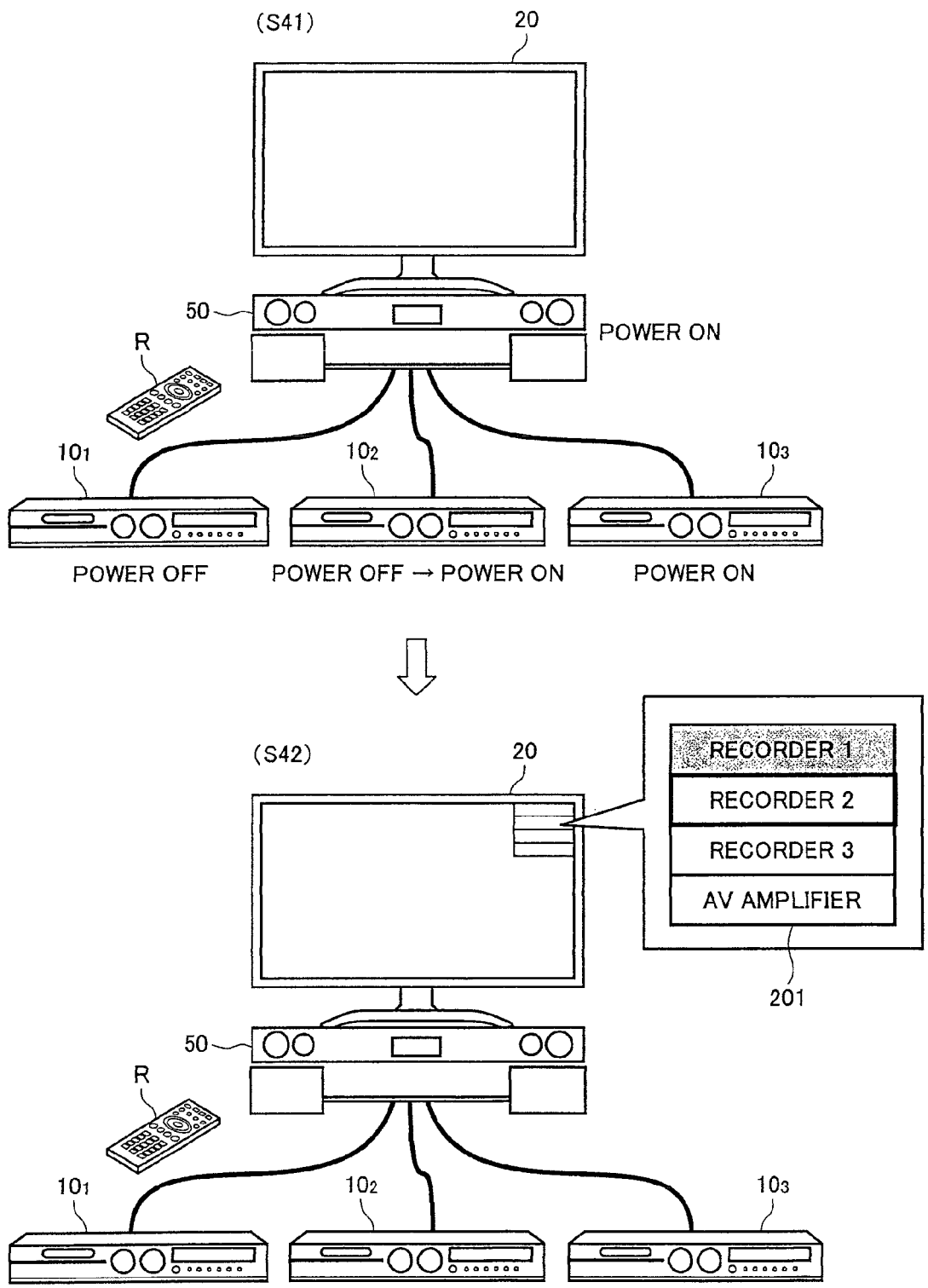
FIG. 13 is a diagram depicting an example of the procedure for displaying the peripheral related data in the case of connecting a plurality of peripherals to the TV.
Figure 14:
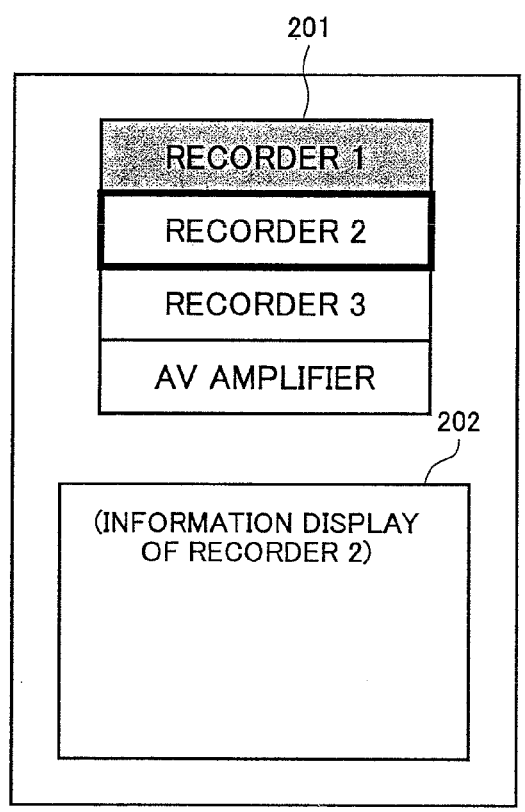
FIG. 14 is a diagram depicting another display example of the peripheral related data of a peripheral.

FIG. 13 is a diagram depicting an example of the procedure for displaying the peripheral related data in the case of connecting a plurality of peripherals to the TV 20. Here, a case is depicted where a single AV amplifier 50 is connected to the TV 20, with three recorders $10_1$, $10_2$, and $10_3$ being connected to the AV amplifier 50. The TV 20, the AV amplifier 50, and the recorder $10_3$ are powered on and the recorders $10_1$ and $10_2$ are powered off.

First, the user powers on the recorder $10_2$ (S41) and then acts on the remote control device R to allow a display of a peripheral list 201 connected to the TV 20 (S42). The peripheral list 201 carries names of the peripherals currently connected to the TV 20. The recorders $10_1$, $10_2$, and $10_3$ and the AV amplifier 50 correspond respectively to recorders 1, 2, and 3 and an AV amplifier. At this time, the display of the powered-off recorder 1 is grayed out.

In the peripheral list 201, the most-recently powered-on recorder 2 is recognized as an active peripheral that is emphasized and displayed by a bold frame on the peripheral list 201 so as to be identifiable from the other peripherals. By selecting the recorder 1 in off state, the recorder 1 may be powered on to operate the recorder 1. In this case, the display of the recorder 1 is emphasized.

Then, when the user acts on the remote control device R to select a peripheral whose peripheral related data are desired to be displayed, peripheral related data corresponding to the peripheral are displayed. The peripheral related data are by way of example displayed at the position indicated in FIG. 5 described earlier. As another display example of the peripheral related data, as depicted in FIG. 14, peripheral related data 202 of the peripheral selected by the user may be displayed under the peripheral list 201. Since the recorder 2 is selected in this example, the peripheral related data 202 of the recorder 2 are displayed.

Figure 15:
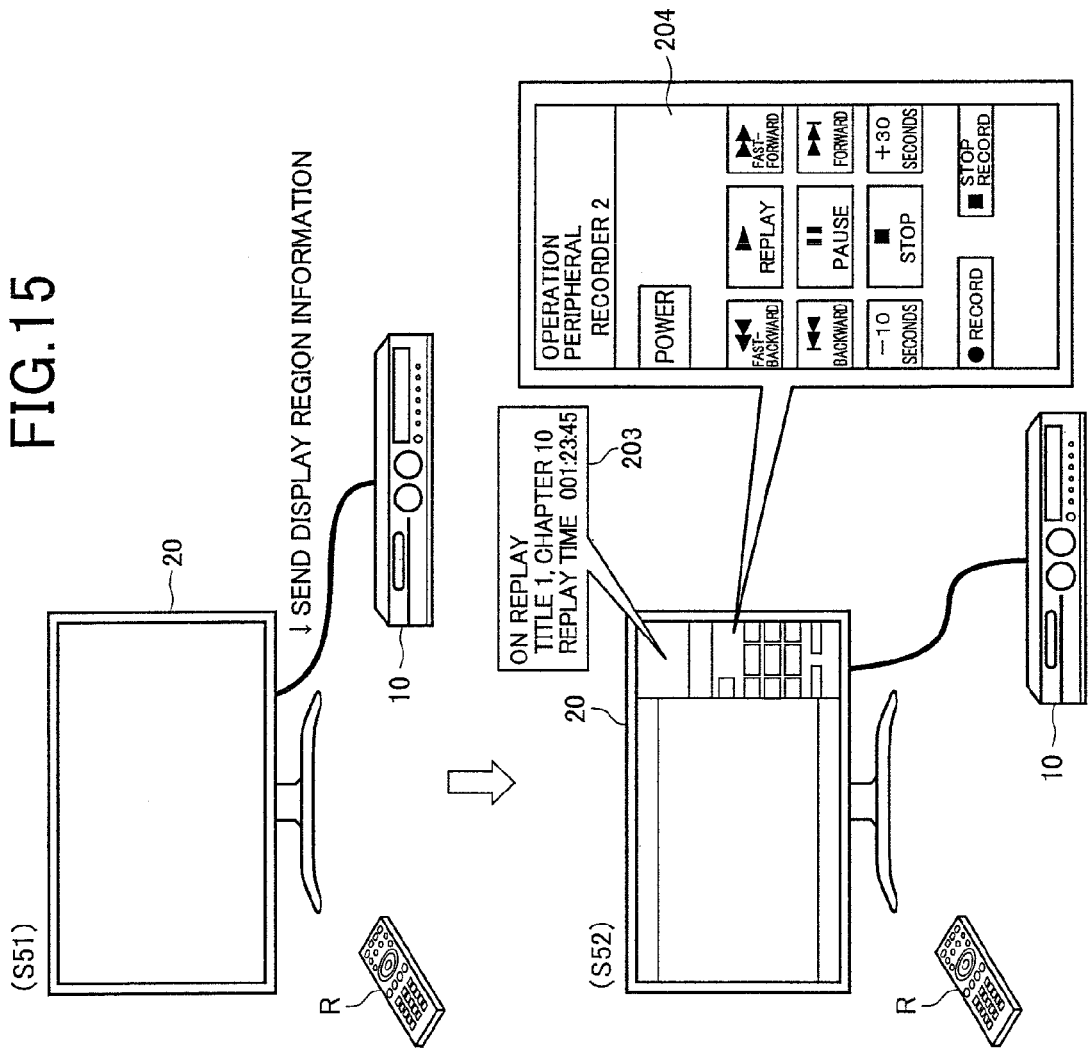
FIG. 15 is a diagram for explaining a display example of the peripheral related data according to the present invention.

FIG. 15 is a diagram for explaining a display example of the peripheral related data according to the present invention. In this example, an operation panel display region 204 of the image data for operation buttons is disposed in addition to an information display region 203 displaying equipment related data such as the status of equipment. The equipment related data in the case of the example of recorder 10 refer to information such as title, chapter, replay time, hour, and channel about a program content being currently replayed. When the status of action of the recorder 10 changes, the recorder 10 may send the changed status of action to the TV 20 so that the TV 20 can update the status information in screen display based on the status of action sent from the recorder 10. The change of the status of action refers to e.g., a case where there changes the chapter number of the content being currently replayed by the recorder 10.

As described above, the TV 20 determines in advance the arrangement position and the size of an information display region to be arranged on the screen and imparts thereto region identification information for identifying the information display region. Then, the TV 20 retains display region information consisting of the arrangement position, the size, and the region identification information, of the information display region. When the display region information is sent from the TV 20 to the recorder 10, the recorder 10 determines an information display region to arrange the peripheral related data in and sends region identification information on the region together with the peripheral related data to the TV 20. The TV 20 displays the peripheral related data sent from the recorder 10 in the information display region identified by the region identification information.

In FIG. 15, first, the TV 20 sends the display region information to the recorder 10, as earlier described in FIG. 4, when confirming that the recorder 10 supports the information display region expansion function (S51). Upon the reception of this, the recorder 10 sends to the TV 20 periphery related data and region identification information on an information display region to display the periphery related data in. Then, the TV 20 disposes the peripheral related data sent from the recorder 10 in the information display region 203 corresponding to the region identification information, to display them together with the image data for the operation buttons arranged in the operation panel display region 204 (S52).

Although in the above embodiments, the HDMI, HDMI CEC, and HDMI HEC have exemplarily been described as communication means, these are not intended to be limitative, and instead, IEEE1394, LAN, power line communication, radio communication, optical communication, etc., may be utilized. Although the recorder has been described as a typical peripheral, it is natural not to be limited thereto. Examples will be shown below of adaptable peripherals, the contents of display thereof, and the contents of operation thereof.

(1) The recorder and a player can display information such as name of a program on replay, replay time, chapter, track, and recording timer and can perform operations such as channel selection operation, replay operation, and recording operation.

(2) Audio equipment can display information such as volume, input mode, and sound mode and can perform operations such as volume operation, input mode change, and sound mode change.

Figure 16:
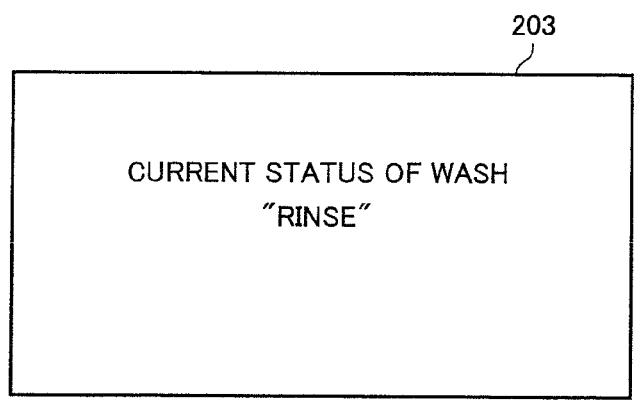
FIG. 16 is a diagram depicting an example of the peripheral related data of a washing machine.

(3) A washing machine can display information such as the status of washing (wash/rinse/spin-dry/dry) as depicted in FIG. 16 and can perform operations such as action mode change, start of selecting action, pause, and stop.

(4) A refrigerator can display information such as the temperature of the interior (cold compartment/freezing compartment/temperature holding compartment) and ion generation concentration (when having an ion generator) and can perform operations such as regulation of the interior temperature and setting of additional functions.

(5) An air conditioner can display information such as the room temperature, air direction, air amount, functions (air-conditioning/heating/dehumidifying/air-sending), timer, and ion generation concentration (having an ion generator) and can perform operations such as change of the set room temperature, change of action mode, timer setting, start of action, pause, and stop.

(6) A vacuum cleaner can display information such as notice of dust disposal time and filter clogging and can perform operations such as change of action mode, start of action, pause, and stop.

(7) An air cleaner, a humidifier, and a dehumidifier can display information such as the temperature, humidity, state of air (clean/dirty) and can perform operations such as change of action mode, start of action, pause, and stop.

(8) The ion generator can display information such as ion generation concentration and can perform operations such as change of action mode, start of action, pause, and stop.

(10) A solar power generator can display information such as power generation amount, consumption corresponding to the power generation amount, and weather and can perform operations such as change of action mode, start of action, pause, and stop.

(11) A cell phone can display information such as incoming call and arrival of mail and can perform operations such as change of action mode, change of various settings, and call out and call in.

(12) A telephone, facsimile, and a telephone with liquid crystal display can display information such as notice of incoming call and name and photograph of the other party and can perform operations such as change of action mode, change of various settings, and call out and call in.

(13) A photo player can display information such as photograph, thumbnail, and list and can perform operations such as change of action mode, start of action, pause, and stop.

(14) A projector can display information such as picture quality mode and can perform operations such as change of action mode, start of action, pause, and stop.

(15) A microwave oven, a multifunctional microwave oven, and a toaster oven can display information such as cooking time and notice of completion of cooking and can perform operations such as change of action mode, start of action, pause, and stop.

(16) A rice cooker can display information such as cooking time and notice of completion of cooking and can perform operations such as change of action mode, start of action, pause, and stop.

(17) A multifunctional machine or a copying machine can display information such as the remainder of paper and the remainder of ink and can perform operations such as change of action mode, start of action, pause, and stop.

Figure 17:
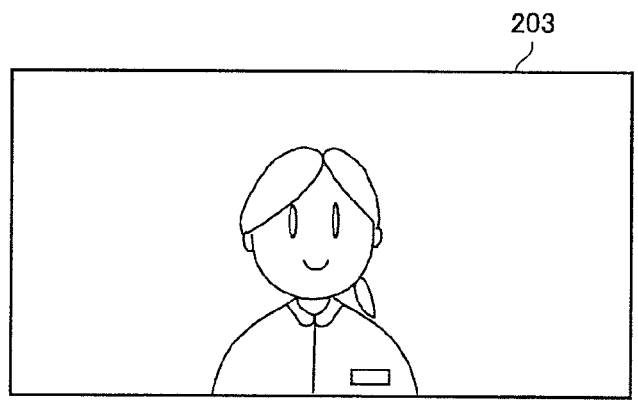
FIG. 17 is a diagram depicting an example of the peripheral related data of a wireless camera system.

(18) A wireless camera system (living door scope) can display notice of intercom and image data of a face of a visitor as depicted in FIG. 17 and allows operations such as change of action mode and response.

EXPLANATION OF REFERENCE NUMERALS

10 . . . recorder, 11 . . . HDMI transmitter, 12,21 . . . main microcomputer, 13 . . . front microcomputer, 14,24 . . . CEC I/F, 15,25 . . . communication I/F, 16,26 . . . remote control light receiving portion, 17,27 . . . HDMI connector, 18, 28 . . . LAN I/F, 19,29 . . . memory portion, 20 . . . TV, 22 . . . HDMI receiver, 23 . . . monitor microcomputer, 30 . . . display portion, 40 . . . HDMI cable, 41 . . . TMDS line, 42 . . . CEC line, 43 . . . HEC line

The invention claimed is:

1. A peripheral information display system comprising, connected thereto, at least one peripheral and a display device capable of displaying peripheral related data of each respective said at least one peripheral, wherein
the display device has
a memory portion that stores display region information containing region identification information for identifying a display region and
a sending portion that transmits the display region information to the peripheral,
the peripheral has
a display region information acquiring portion that acquires display region information stored in the memory portion of the display device,
a peripheral control portion that arranges the peripheral related data of the peripheral in accordance with the display region information acquired from the display device by the display region information acquiring portion and relates the peripheral related data with the region identification data, and
a peripheral related data sending portion that sends the arranged peripheral related data and the related region identification information by the peripheral control portion, and
the display device has
a display device control portion that controls to dispose and display the arranged peripheral related data sent from the peripheral related data sending portion of the peripheral in the display region identified by the region identification information,
the peripheral related data is status information indicative of a status of action of the peripheral, when the status of action of the peripheral changes, the peripheral control portion of the peripheral sends a part of the status information that has changed to the display device from the peripheral related data sending portion and the display device control portion of the display device updates the status information displayed by the display device control portion based on the changed part of status information sent from the peripheral.

2. The peripheral information display system as defined in claim 1, wherein the display device control portion of the display device performs scaling of an input video signal such that a display region of the input video signal input to the display device does not overlap with a display region of peripheral related data of the peripheral.

3. The peripheral information display system as defined in claim 1, wherein the display region information is information containing a size and a display position of the display region to display the peripheral related data of the peripheral in.

4. The peripheral information display system as defined in claim 3, wherein the peripheral control portion of the peripheral lays the peripheral related data out so as to be accommodated within a display region identified by the region identification information when sending the peripheral related data in association with the region identification information to the display device.

5. The peripheral information display system as defined in claim 4, wherein the peripheral control portion of the peripheral acquires an offset signal for adjusting an arrangement position in the display region of the laid-out peripheral related data so as to fit the size of the display region and controls to send the offset signal from the peripheral related data sending portion to the display device.

6. The peripheral information display system as defined in claim 4, wherein the display device control portion of the peripheral resizes a display size of the laid-out peripheral related data so as to fit the size of the display region.

7. The peripheral information display system as defined in claim 1, wherein the display device control portion of the display device determines whether the peripheral supports information display functions provided by the peripheral information display system, and, if supported, controls to send the display region information from the sending portion to the peripheral.

8. A display device making up the peripheral information display system as defined in claim 1.

9. A peripheral making up the peripheral information display system as defined in claim 1.

* * * * *